US011858554B2

(12) United States Patent
Song

(10) Patent No.: US 11,858,554 B2

(45) Date of Patent: Jan. 2, 2024

(54) COWL REINFORCEMENT STRUCTURE OF VEHICLE

(71) Applicants: HYUNDAI MOTOR COMPANY, Seoul (KR); Kia Corporation, Seoul (KR)

(72) Inventor: HanSeok Song, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/406,447

(22) Filed: Aug. 19, 2021

(65) Prior Publication Data

US 2022/0266920 A1 Aug. 25, 2022

(30) Foreign Application Priority Data

Feb. 23, 2021 (KR) ........................ 10-2021-0024119

(51) Int. Cl.
*B62D 25/08* (2006.01)
*B60R 21/34* (2011.01)

(52) U.S. Cl.
CPC ............ *B62D 25/081* (2013.01); *B60R 21/34* (2013.01)

(58) Field of Classification Search
CPC ....... B62D 25/081; B62D 25/08; B62D 25/14
USPC ......... 296/192, 72, 70, 193, 187.09, 203.02; 180/89.1, 90
See application file for complete search history.

(56) References Cited

U.S. PATENT DOCUMENTS

| | | | | |
|---|---|---|---|---|
| 6,921,126 | B2 * | 7/2005 | Suh | B62D 25/088 296/203.02 |
| 7,140,674 | B2 * | 11/2006 | Miyoshi | B62D 25/04 296/203.02 |
| 7,604,278 | B2 * | 10/2009 | Penner | B62D 25/145 296/72 |
| 9,446,797 | B2 * | 9/2016 | Nakauchi | B62D 25/088 |
| 10,843,738 | B2 * | 11/2020 | Yamauchi | B62D 25/04 |
| 2019/0002032 | A1 * | 1/2019 | Takii | B62D 27/065 |

* cited by examiner

*Primary Examiner* — Amy R Weisberg
*Assistant Examiner* — Sunsurraye Westbrook
(74) *Attorney, Agent, or Firm* — MORGAN, LEWIS & BOCKIUS LLP

(57) ABSTRACT

A cowl reinforcement structure of a vehicle according to an embodiment of the present disclosure for reinforcement of a cowl upper panel connected to a dash panel by forming a curved line along a front and rear direction of the vehicle includes a cowl upper side reinforcement member provided in a shape corresponding to the curved line of the cowl upper panel at the lower part of the cowl upper panel; and a cowl support bracket joined to the cowl upper side reinforcement member at the lower part of the cowl upper panel.

9 Claims, 8 Drawing Sheets

Front of the vehicle
20
30
40
10
50

COWL REINFORCEMENT STRUCTURE OF VEHICLE

CROSS-REFERENCE TO RELATED APPLICATION

This application claims the benefit of priority to Korean Patent Application No. 10-2021-0024119 filed on Feb. 23, 2021 in the Korean Intellectual Property Office, the entire contents of which are incorporated herein by reference.

TECHNICAL FIELD

The present disclosure relates to a cowl reinforcement structure of a vehicle. More particularly, the present disclosure relates to a cowl reinforcement structure of a vehicle that simultaneously satisfies a NVH performance and a collision absorption performance.

BACKGROUND

In general, the cowl upper panel of the vehicle is a panel disposed in the vehicle width direction corresponding to the lower part of the front glass. This cowl upper panel is connected to the upper end of the dash panel that divides the engine compartment and the vehicle compartment, prevents parts mounted in the engine compartment from being pushed into the vehicle compartment in the event of a vehicle collision, and is manufactured to have strength together with the dash panel.

The existing cowl upper panel blocks a booming noise and increases strength by applying a reinforcement member to improve the NVH (Noise, Vibration, Harshness) performance. However, the existing cowl upper panel does not effectively absorb collision energy when a collision with a pedestrian occurs, so there is a problem of increasing an injury value of pedestrians. That is, the reinforcement of the existing cowl upper panel has a problem in that the impact force is transmitted to the pedestrian as a repulsive force.

The above information disclosed in this Background section is only for enhancement of understanding of the background of the present disclosure, and therefore it may contain information that does not form the prior art that is already known in this country to a person of ordinary skill in the art.

SUMMARY

Therefore, the present disclosure is to solve the above problem, and an embodiment of the present disclosure applies a reinforcement member along a curved line of a front of a cowl upper panel and applies a cowl support bracket that is connected to the reinforcement member by welding and connects the cowl upper panel and the cowl lower panel, thereby being intended to provide a cowl reinforcement structure that satisfies a pedestrian protection performance and a NVH performance while satisfying an elegant design that extends from the front of the bumper to the roof line.

A cowl reinforcement structure of a vehicle according to an embodiment of the present disclosure for reinforcement of a cowl upper panel connected to a dash panel by forming a curved line along a front and rear direction of the vehicle includes a cowl upper side reinforcement member having a shape corresponding to the curved line of the cowl upper panel and disposed at a lower part of the cowl upper panel; and a cowl support bracket joined to the cowl upper side reinforcement member and disposed at the lower part of the cowl upper panel.

The cowl upper side reinforcement member may include an upper flange, a body extending from the upper flange and having a curved shape, and a lower flange extending from the body, and the upper flange and an upper surface of the lower flange may be joined to the front lower surface of the cowl upper panel, in which a space is formed between the cowl upper panel and the body.

The cowl support bracket includes a first end joined to the lower flange of the cowl upper side reinforcement member, and a second end joined to a cowl lower panel provided at the lower part facing the cowl upper panel.

The upper flange of the cowl upper side reinforcement member and the upper surface of the lower flange may be joined to the lower surface of the cowl upper panel by double welding.

One end of the cowl support bracket may be joined to the lower surface of the lower flange by triple welding.

The body of the cowl upper side reinforcement member may include an opening of a slot shape formed in a length direction of the cowl upper side reinforcement member.

The cowl upper side reinforcement member may be disposed on both sides of a point where the cowl upper panel is divided into four equal parts in a width direction of the vehicle.

The cowl upper side reinforcement member may include a soft thin plate panel.

The cowl support bracket may be disposed on the same line as the cowl upper panel in a height direction of the vehicle.

The cowl support bracket may have a curved shape that is convex toward a center of the vehicle.

According to an embodiment of the present disclosure, it is possible to satisfy a pedestrian protection performance and a NVH performance while satisfying an elegant design extending from the front bumper of the vehicle to the roofline.

DETAILED DESCRIPTION OF THE EMBODIMENTS

Figure 1:
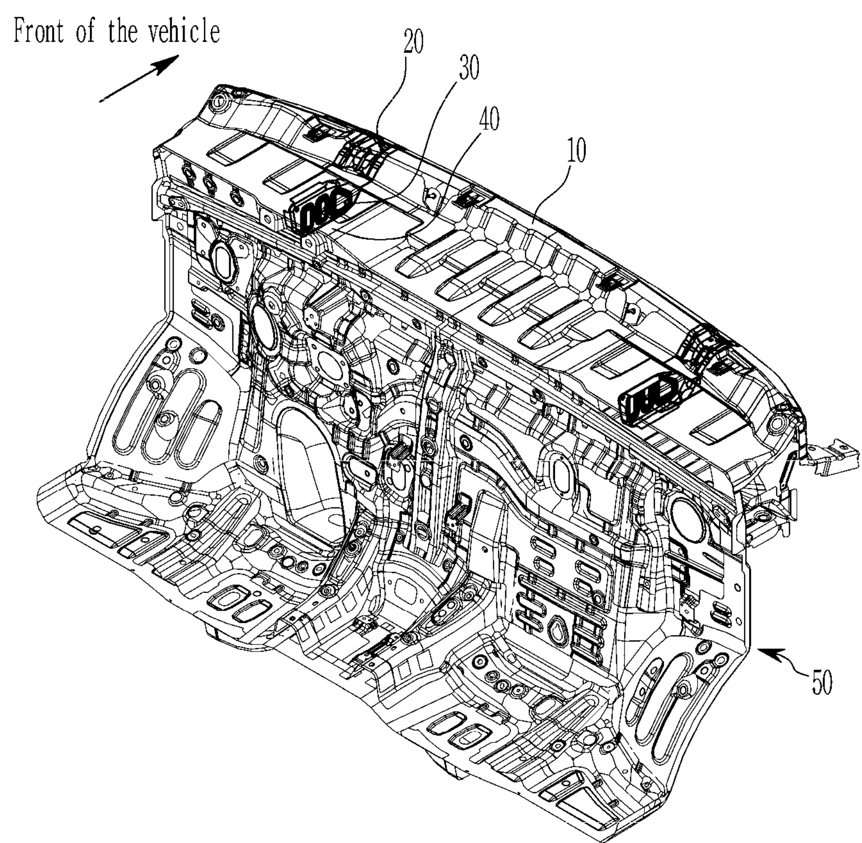
FIG. 1 is a perspective view showing a shape of a vehicle body to which a cowl reinforcement structure of a vehicle according to an embodiment of the present disclosure is applied.

Hereinafter, some embodiments of the present disclosure are described in detail with reference to the accompanying drawings in order for those skilled in the art to be able to readily practice the embodiments. As those skilled in the art would realize, the described embodiments may be modified in various different ways, all without departing from the spirit or scope of the present disclosure.

Further, in embodiments, since like reference numerals designate like elements having the same configuration, a first embodiment is representatively described, and in other embodiments, only different configurations from the first embodiment will be described.

The drawings are schematic and are not illustrated in accordance with a scale. The relative sizes and ratios of the parts in the drawings are exaggerated or reduced for clarity and convenience in the drawings, and the arbitrary sizes are only examples and are not limiting. The same structures, elements, or parts illustrated in no less than two drawings are denoted by the same reference numerals in order to represent similar characteristics. When a part is referred to as being "on" another part, it can be directly on the other part or intervening parts may also be present.

Embodiments of the present disclosure specifically show one embodiment of the present disclosure. As a result, various modifications of the drawings are anticipated. Accordingly, the embodiments are not limited to certain forms of the regions illustrated, but may include forms that are modified through manufacturing, for example.

Hereinafter, with reference to the accompanying drawings, a cowl reinforcement structure of a vehicle according to an embodiment of the present disclosure will be described in detail.

Figure 2:
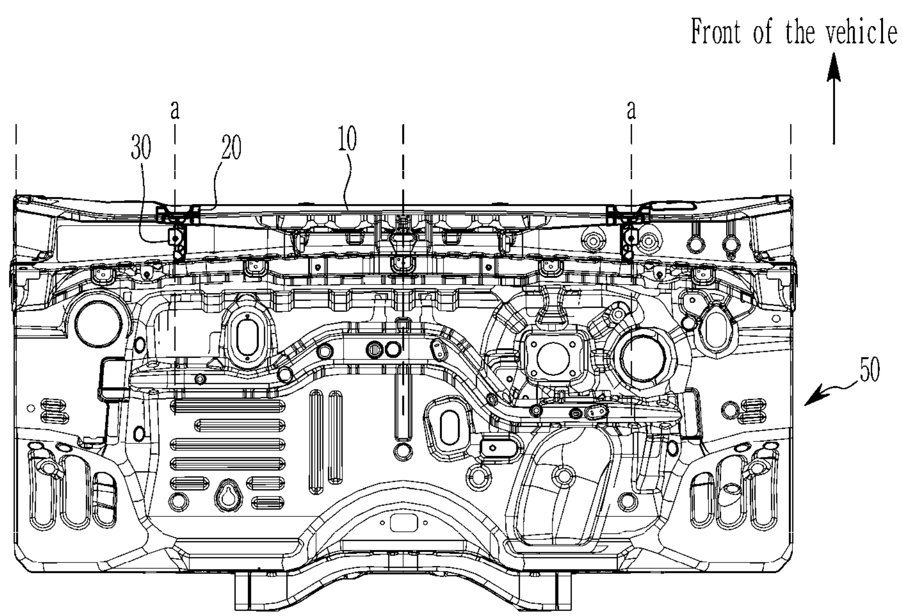
FIG. 2 is a top plan view showing a shape of a vehicle body to which a cowl reinforcement structure of a vehicle according to an embodiment of the present disclosure is applied.

FIG. 1 is a perspective view showing a shape of a vehicle body to which a cowl reinforcement structure of a vehicle according to an embodiment of the present disclosure is applied, and FIG. 2 is a top plan view showing a shape of a vehicle body to which a cowl reinforcement structure of a vehicle according to an embodiment of the present disclosure is applied.

Referring to FIG. 1 and FIG. 2, the cowl reinforcement structure of the vehicle according to an embodiment of the present disclosure is applied for a reinforcement of a cowl upper panel 10 connected to a dash panel 50. The cowl upper panel 10 is bent at a predetermined angle along the vehicle front and rear direction to form a curved line, and is connected to the dash panel 50 downwards.

The cowl reinforcement structure of the vehicle includes a cowl upper side reinforcement member 20 and a cowl support bracket 30. The cowl upper side reinforcement member 20 is disposed in the lower part of the cowl upper panel 10 in a shape corresponding to the curved line of the cowl upper panel 10. In addition, the cowl support bracket 30 is joined in the vertical direction with the cowl upper side reinforcement member 20 in the lower part of the cowl upper panel 10.

The cowl upper side reinforcement member 20 and cowl support bracket 30 are bonded to each other as shown in FIG. 2, and may be disposed on both sides (a part 'a') of the point where the cowl upper panel 10 is divided into quarters in the width direction of the vehicle.

Figure 3:
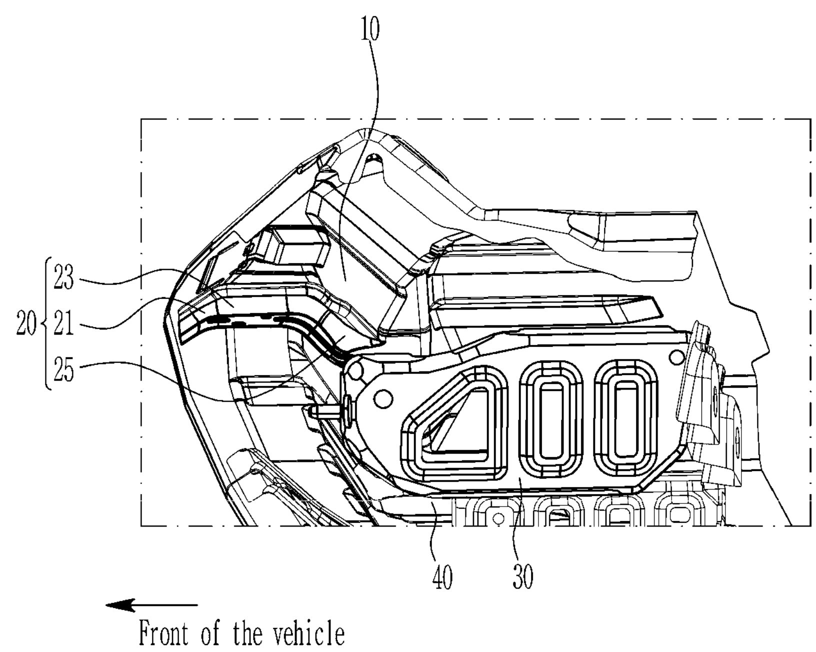
FIG. 3 is a view showing a shape of a cowl reinforcement structure of a vehicle in a vehicle lateral direction according to an embodiment of the present disclosure.
Figure 4:
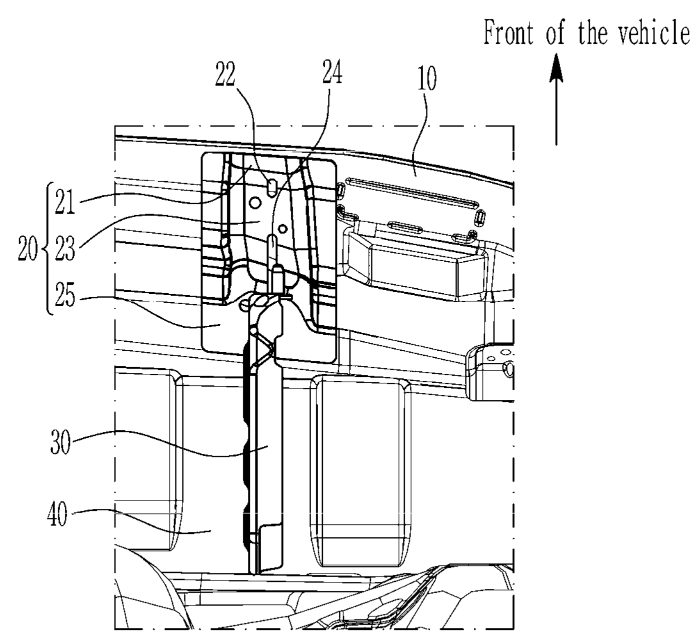
FIG. 4 is a view showing a shape of a cowl reinforcement structure of a vehicle in a vehicle lower direction according to an embodiment of the present disclosure.

FIG. 3 is a view showing a shape of a cowl reinforcement structure of a vehicle in a vehicle lateral direction according to an embodiment of the present disclosure, and FIG. 4 is a view showing a shape of a cowl reinforcement structure of a vehicle in a vehicle lower direction according to an embodiment of the present disclosure.

Referring to FIG. 3 and FIG. 4, the cowl upper side reinforcement member 20 includes an upper flange 21, a body 23 integrally extending from the upper flange 21 and having a curved shape, and a lower flange 25 extending integrally from the body 23.

The body 23 of the cowl upper side reinforcement member 20 may include an opening 24 in a form of a slot formed in the length direction of the cowl upper side reinforcement member 20. A slot-shaped opening 22 may be additionally disposed at a portion of the body 23 adjacent to the upper flange 21. In addition, the cowl upper side reinforcement member 20 may be formed of a soft thin plate panel.

In this way, by forming the openings 22 and 24 in the form of the slot shape on the body 23 of the cowl upper side reinforcement member 20 and forming the cowl upper side reinforcement member 20 of the soft thin plate panel, when the vehicle collides with a pedestrian, the cowl upper side reinforcement member 20 may absorb the impact smoothly, thereby reducing the pedestrian's injury value.

On the other hand, the upper flange 21 of the cowl upper side reinforcement member 20 and the upper surface of the lower flange 25 are joined to the front lower surface of the cowl upper panel 10. Further, the cowl support bracket 30 may include a first end joined to the lower flange 25 of the cowl upper side reinforcement member 20, and a second end joined to the cowl lower panel 40 disposed in the lower part facing the cowl upper panel 10. The upper surface of the first end of the cowl support bracket 30 may be joined by welding to the lower surface of the lower flange 25 in the approximately central part of the cowl upper side reinforcement member 20, and the cowl support bracket 30 may be disposed on the same line as the cowl upper panel 10 in the height direction of the vehicle.

By the mutual connection structure of the cowl upper side reinforcement member 20 and the cowl support bracket 30, the bonding structure in the cowl upper panel 10 of the cowl upper side reinforcement member 20 and the bonding structure in the cowl lower panel 40 of the cowl support bracket 30, the strength of the cowl upper panel 10 may be reinforced and improved and the NVH performance may be improved.

Figure 5:
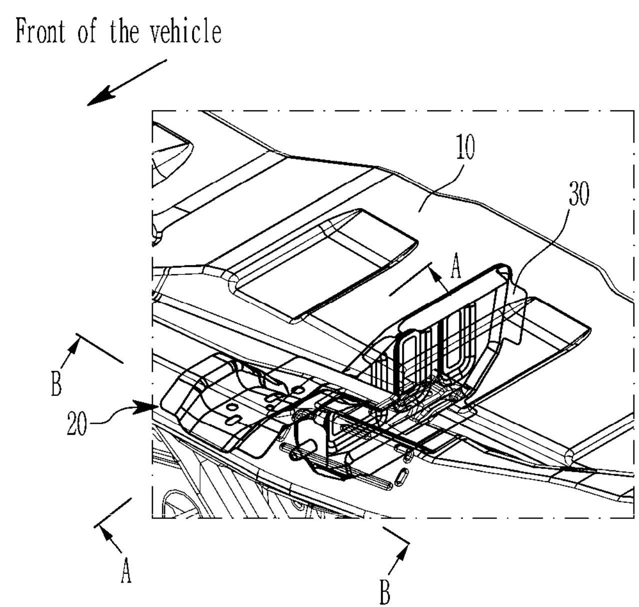
FIG. 5 is a perspective view showing a cowl reinforcement structure of a vehicle according to an embodiment of the present disclosure.
Figure 6:
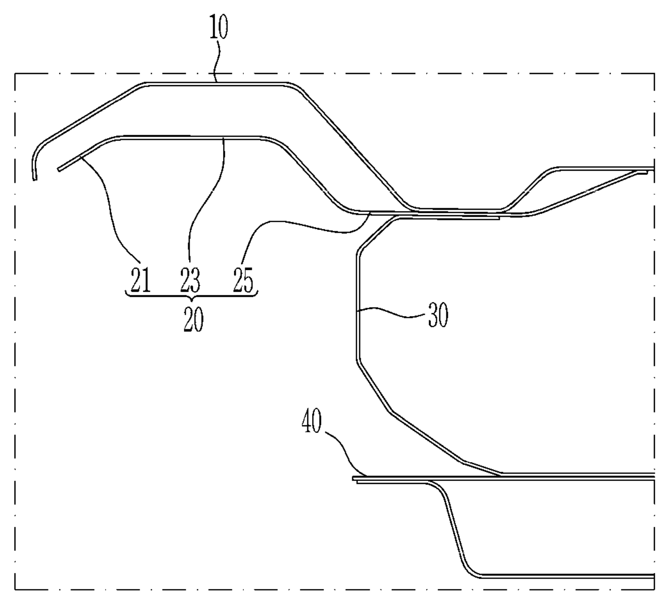
FIG. 6 is a cross-sectional view of a cowl reinforcement structure of a vehicle taken along a line A-A of FIG. 5 according to an embodiment of the present disclosure.
Figure 7:
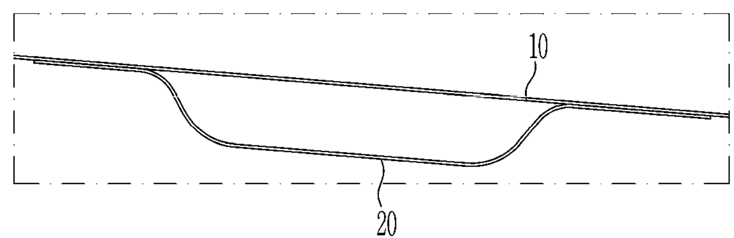
FIG. 7 is a cross-sectional view of a cowl reinforcement structure of a vehicle taken along a line B-B of FIG. 5 according to an embodiment of the present disclosure.
Figure 8:
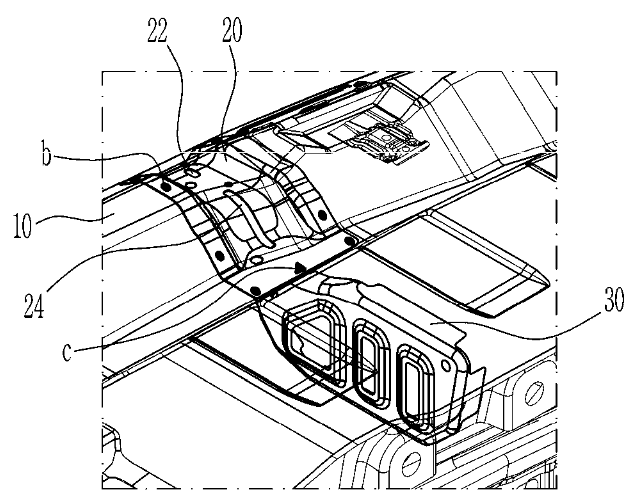
FIG. 8 is a perspective view showing a shape in which a cowl reinforcement structure of a vehicle according to an embodiment of the present disclosure is coupled by welding.

FIG. 5 is a perspective view showing a cowl reinforcement structure of a vehicle according to an embodiment of the present disclosure, FIG. 6 is a cross-sectional view of a cowl reinforcement structure of a vehicle taken along a line A-A of FIG. 5 according to an embodiment of the present disclosure, FIG. 7 is a cross-sectional view of a cowl reinforcement structure of a vehicle taken along a line B-B of FIG. 5 according to an embodiment of the present disclosure, and FIG. 8 is a perspective view showing a shape in which a cowl reinforcement structure of a vehicle according to an embodiment of the present disclosure is coupled by welding.

Referring to FIG. 6, the upper flange 21 of the cowl upper side reinforcement member 20 and the upper surface of the lower flange 25 are joined to the front lower surface of the cowl upper panel 10, thereby forming a space between the cowl upper panel 10 and the body 23. Then, the first end of the cowl support bracket 30 is joined to the lower surface of the lower flange 25, and the second end of the cowl support bracket 30 is joined to the upper surface of the cowl lower panel 40. The cowl support bracket 30 may have a curved shape that is convex toward the center of the vehicle.

Referring to FIG. 7, the cowl upper side reinforcement member 20 may be formed in a shape having a phase in which the central portion is lower than the edge portion in the width direction of the vehicle. That is, the upper surface of the edge portion of the cowl upper side reinforcement member 20 may be joined to the lower surface of the cowl upper panel 10. Therefore, a space may be formed between the central portion of the cowl upper side reinforcement member 20 and the cowl upper panel 10.

By forming the space between the cowl upper panel 10 and the body 23 of the cowl upper side reinforcement member 20, and forming the space between the central part of the cowl upper side reinforcement member 20 and the cowl upper panel 10, the vibration input from the front of the vehicle may be absorbed, thereby reducing the noise inside the vehicle. In addition, the collision absorption performance may be improved by allowing the cowl upper panel 10 to be deformed smoothly when the vehicle collides with pedestrians.

Referring to FIG. 8, the upper flange 21 of the cowl upper side reinforcement member 20 and the lower surface of the lower flange 25 may be joined to the lower surface of the cowl upper panel 10 by double welding at the 'b' part. In addition, the first end of cowl support bracket 30 may be joined to the lower surface of the lower flange 25 of the cowl upper side reinforcement member 20 at the 'c' part by triple welding. That is, in the 'c' part, the upper surface of the first end of the cowl support bracket 30 may be welded to the lower surface of the lower flange 25 of the cowl upper side reinforcement member 20, and the upper surface of the lower flange 25 of the cowl upper side reinforcement member 20 may be welded to the lower surface of the cowl upper panel 10.

In this way, by applying the cowl reinforcement structure of the vehicle according to an embodiment of the present disclosure, while satisfying the elegant design from the front of the bumper of the vehicle to the roofline, it is possible to satisfy the pedestrian protection performance and the NVH performance.

While the present disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

What is claimed is:

1. A cowl reinforcement structure of a vehicle for reinforcement of a cowl upper panel connected to a dash panel by forming a curved line along a front and rear direction of the vehicle, the cowl reinforcement structure comprising:

a cowl upper side reinforcement member having a shape corresponding to the curved line of the cowl upper panel and disposed at a lower part of the cowl upper panel; and a cowl support bracket joined to the cowl upper side reinforcement member and disposed at the lower part of the cowl upper panel, wherein the cowl support bracket includes a first end joined to the cowl upper side reinforcement member, and a second end joined to a cowl lower panel disposed at the lower part of the cowl upper panel and facing the cowl upper panel.

2. The cowl reinforcement structure of the vehicle of claim 1, wherein the cowl upper side reinforcement member includes an upper flange, a body extending from the upper flange and having a curved shape, and a lower flange extending from the body, and wherein the upper flange and an upper surface of the lower flange are joined to a front lower surface of the cowl upper panel, wherein a space is formed between the cowl upper panel and the body.

3. The cowl reinforcement structure of the vehicle of claim 2, wherein the upper flange of the cowl upper side reinforcement member and the upper surface of the lower flange are joined to the front lower surface of the cowl upper panel by double welding.

4. The cowl reinforcement structure of the vehicle of claim 2, wherein the first end of the cowl support bracket is joined to the front lower surface of the lower flange by triple welding.

5. The cowl reinforcement structure of the vehicle of claim 2, wherein the body of the cowl upper side reinforcement member includes an opening of a slot shape formed in a length direction of the cowl upper side reinforcement member.

6. The cowl reinforcement structure of the vehicle of claim 1, wherein the cowl upper side reinforcement member is disposed on both sides of a point where the cowl upper panel is divided into four equal parts in a width direction of the vehicle.

7. The cowl reinforcement structure of the vehicle of claim 1, wherein the cowl upper side reinforcement member includes a plate panel.

8. The cowl reinforcement structure of the vehicle of claim 1, wherein the cowl support bracket is disposed on a same line as the cowl upper panel in a height direction of the vehicle.

9. The cowl reinforcement structure of the vehicle of claim 1, wherein the cowl support bracket has a curved shape that is convex toward a center of the vehicle.

* * * * *